United States Patent
Li et al.

(10) Patent No.: US 10,884,654 B2
(45) Date of Patent: Jan. 5, 2021

(54) SYSTEM AND METHOD FOR QUALITY OF SERVICE ASSURANCE OF MULTI-STREAM SCENARIOS IN A HARD DISK DRIVE

(71) Applicant: Alibaba Group Holding Limited, Grand Cayman (KY)

(72) Inventors: Shu Li, Bothell, WA (US); Jianjian Huo, San Jose, CA (US)

(73) Assignee: Alibaba Group Holding Limited, George Town (KY)

( * ) Notice: Subject to any disclaimer, the term of this patent is extended or adjusted under 35 U.S.C. 154(b) by 75 days.

(21) Appl. No.: 16/237,317

(22) Filed: Dec. 31, 2018

(65) Prior Publication Data

US 2020/0210100 A1 Jul. 2, 2020

(51) Int. Cl.
| | |
|---|---|
| *G06F 13/00* | (2006.01) |
| *G06F 13/28* | (2006.01) |
| *G06F 3/06* | (2006.01) |
| *G06F 11/10* | (2006.01) |

(52) U.S. Cl.
CPC .......... *G06F 3/0656* (2013.01); *G06F 3/0619* (2013.01); *G06F 3/0644* (2013.01); *G06F 3/0679* (2013.01); *G06F 11/1004* (2013.01)

(58) Field of Classification Search
CPC combination set(s) only.
See application file for complete search history.

(56) References Cited

U.S. PATENT DOCUMENTS

| | | | |
|---|---|---|---|
| 4,775,932 A | 10/1988 | Oxley | |
| 6,226,650 B1 | 5/2001 | Mahajan et al. | |
| 7,565,454 B2 | 7/2009 | Zuberi | |
| 8,260,924 B2 | 9/2012 | Koretz | |
| 8,452,819 B1 | 5/2013 | Sorenson, III | |
| 8,516,284 B2 | 8/2013 | Chan | |
| 8,751,763 B1 | 6/2014 | Ramarao | |

(Continued)

FOREIGN PATENT DOCUMENTS

| | | |
|---|---|---|
| JP | 2003022209 | 1/2003 |
| JP | 2011175422 | 9/2011 |
| WO | 1994018634 | 8/1994 |

OTHER PUBLICATIONS

Tsuchiya, Yoshihiro et al. "DBLK: Deduplication for Primary Block Storage", MSST 2011, Denver, CO, May 23-27, 2011 pp. 1-5.

(Continued)

*Primary Examiner* — Yong J Choe
(74) *Attorney, Agent, or Firm* — Shun Yao; Park, Vaughan, Fleming & Dowler LLP

(57) ABSTRACT

One embodiment facilitates data placement in a storage device. During operation, the system receives incoming data from multiple streams, wherein the incoming data includes a plurality of data parts. The system formats the data parts by inserting a header before and a tail after each data part, wherein a formatted data part includes a respective data part, the header, and the tail, and wherein the header and the tail indicate an order and a destination zone for the respective data part within a stream. The system sequentially writes the formatted data parts to a pre-allocated journal zone of a non-volatile memory of the storage device. The system concatenates the data parts in the order indicated by their respective header and tail. The system sequentially writes the concatenated data parts to the non-volatile memory based on the destination zone indicated by their respective header and tail.

20 Claims, 9 Drawing Sheets

(56) References Cited

U.S. PATENT DOCUMENTS

| | | |
|---|---|---|
| 8,825,937 B2 | 9/2014 | Atkisson |
| 9,043,545 B2 | 5/2015 | Kimmel |
| 9,088,300 B1 | 7/2015 | Chen |
| 9,092,223 B1 | 7/2015 | Pani |
| 9,280,472 B1 | 3/2016 | Dang |
| 9,280,487 B2 | 3/2016 | Candelaria |
| 9,529,601 B1 | 12/2016 | Dharmadhikari |
| 9,588,698 B1 | 3/2017 | Karamcheti |
| 9,588,977 B1 | 3/2017 | Wang |
| 1,001,316 A1 | 7/2018 | Fisher |
| 2002/0010783 A1 | 1/2002 | Primak |
| 2002/0073358 A1 | 6/2002 | Atkinson |
| 2002/0161890 A1 | 10/2002 | Chen |
| 2003/0163594 A1 | 8/2003 | Aasheim |
| 2003/0163633 A1 | 8/2003 | Aasheim |
| 2004/0010545 A1 | 1/2004 | Pandya |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0156012 A1 | 7/2006 | Beeson |
| 2007/0033323 A1 | 2/2007 | Gorobets |
| 2007/0101096 A1 | 5/2007 | Gorobets |
| 2008/0034154 A1 | 2/2008 | Lee |
| 2009/0113219 A1 | 4/2009 | Aharonov |
| 2009/0282275 A1 | 11/2009 | Yermalayeu |
| 2009/0307249 A1 | 12/2009 | Koifman |
| 2009/0310412 A1 | 12/2009 | Jang |
| 2010/0169470 A1 | 7/2010 | Takashige |
| 2010/0229224 A1 | 9/2010 | Etchegoyen |
| 2010/0325367 A1 | 12/2010 | Kornegay |
| 2011/0055458 A1 | 3/2011 | Kuehne |
| 2011/0153903 A1 | 6/2011 | Hinkle |
| 2011/0218969 A1 | 9/2011 | Anglin |
| 2011/0231598 A1 | 9/2011 | Hatsuda |
| 2011/0292538 A1 | 12/2011 | Haga |
| 2011/0302353 A1 | 12/2011 | Confalonieri |
| 2012/0084523 A1 | 4/2012 | Littlefield |
| 2012/0117399 A1 | 5/2012 | Chan |
| 2012/0147021 A1 | 6/2012 | Cheng |
| 2012/0159289 A1 | 6/2012 | Piccirillo |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2013/0061029 A1 | 3/2013 | Huff |
| 2013/0073798 A1 | 3/2013 | Kang |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0219131 A1 | 8/2013 | Alexandron |
| 2013/0318283 A1 | 11/2013 | Small |
| 2014/0108414 A1 | 4/2014 | Stillerman |
| 2014/0181532 A1 | 6/2014 | Camp |
| 2014/0233950 A1 | 8/2014 | Luo |
| 2014/0250259 A1 | 9/2014 | Ke |
| 2014/0304452 A1 | 10/2014 | De la Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0142752 A1 | 5/2015 | Chennamsetty |
| 2015/0227316 A1 | 8/2015 | Warfield |
| 2015/0277937 A1 | 10/2015 | Swanson |
| 2015/0304108 A1 | 10/2015 | Obukhov |
| 2015/0363271 A1 | 12/2015 | Haustein |
| 2015/0372597 A1 | 12/2015 | Luo |
| 2016/0014039 A1 | 1/2016 | Reddy |
| 2016/0098344 A1 | 4/2016 | Gorobets |
| 2016/0110254 A1 | 4/2016 | Cronie |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0343429 A1 | 11/2016 | Nieuwejaar |
| 2016/0350002 A1 | 12/2016 | Vergis |
| 2017/0075583 A1 | 3/2017 | Alexander |
| 2017/0075594 A1 | 3/2017 | Badam |
| 2017/0109232 A1 | 4/2017 | Cha |
| 2017/0162235 A1 | 6/2017 | De |
| 2017/0168986 A1 | 6/2017 | Sajeepa |
| 2017/0212708 A1 | 7/2017 | Suhas |
| 2017/0228157 A1 | 8/2017 | Yang |
| 2017/0249162 A1 | 8/2017 | Tsirkin |
| 2017/0262178 A1 | 9/2017 | Hashimoto |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0088867 A1 | 3/2018 | Kaminaga |
| 2018/0143780 A1 | 5/2018 | Cho |
| 2018/0167268 A1 | 6/2018 | Liguori |
| 2018/0189182 A1 | 7/2018 | Wang |
| 2018/0270110 A1 | 9/2018 | Chugtu |
| 2018/0329776 A1 | 11/2018 | Lai |
| 2018/0373428 A1 | 12/2018 | Kan |
| 2019/0012111 A1 | 1/2019 | Li |
| 2019/0073262 A1 | 3/2019 | Chen |

OTHER PUBLICATIONS

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Data part formatting in the journal zone

SYSTEM AND METHOD FOR QUALITY OF SERVICE ASSURANCE OF MULTI-STREAM SCENARIOS IN A HARD DISK DRIVE

BACKGROUND

Field

This disclosure is generally related to the field of data storage. More specifically, this disclosure is related to a system and method for quality of service (QoS) assurance of multi-stream scenarios in a hard disk drive.

Related Art

The proliferation of the Internet and e-commerce continues to create a vast amount of digital content. Various storage systems have been created to access and store such digital content. A storage system or server can include multiple drives, such as hard disk drives (HDDs) and solid state drives (SSDs). The memory in a server plays a crucial role in the performance and capacity of a storage system. In the current economy, HDDs are significantly less expensive than SSDs. The capacity of HDDs continues to increase. At the same time, virtualization allows an increasing number of clients to share the resources of the same physical devices (such as an HDD). As a result, a single HDD may receive multiple write jobs in parallel. Each write job is part of a separate stream with multiple data parts, and each stream can be written to a different physical zone of the HDD on a platter. However, because an HDD is a spindle storage device with only one physical write head per platter, the write head must switch or move repeatedly between multiple physical zones on the platter, which can increase both the seek time and the rotation time. This can decrease the efficiency of the HDD as well as the overall efficiency and performance of the storage system, and can also result in a decreased level of QoS assurance.

SUMMARY

One embodiment facilitates data placement in a storage device. During operation, the system receives incoming data from multiple streams, wherein the incoming data includes a plurality of data parts. The system formats the data parts by inserting a header before and a tail after each data part, wherein a formatted data part includes a respective data part, the header, and the tail, and wherein the header and the tail indicate an order and a destination zone for the respective data part within a stream. The system sequentially writes the formatted data parts to a pre-allocated journal zone of a non-volatile memory of the storage device. The system concatenates the data parts in the order indicated by their respective header and tail. The system sequentially writes the concatenated data parts to the non-volatile memory based on the destination zone indicated by their respective header and tail.

In some embodiments, prior to sequentially writing the concatenated data parts to the non-volatile memory: the system detects a fault; and the system reconstructs a mapping between a logical address of a data part and a physical address of the data part based on a destination zone identifier and a part length indicated by its respective header.

In some embodiments, the received incoming data is placed in a first data buffer. Subsequent to sequentially writing the formatted data parts to the journal zone: the system reads out the formatted data parts from the journal zone into a second data buffer; and the system validates the formatted data parts in the second data buffer.

In some embodiments, validating the formatted data parts in the second data buffer involves, for a respective formatted data part: confirming that a part identifier indicated by its respective header matches a part identifier indicated by its respective tail; and checking the respective data part based on a cyclic redundancy check value indicated by its respective tail.

In some embodiments, the header further indicates: a part start which is a beginning of the respective data part; a part identifier which is a unique identifier of the respective data part; a part length which indicates a number of bits included in the respective data part; a destination zone identifier which is a unique identifier of a zone to which the respective data part is to be written; and a destination zone offset which indicates a position from the part start at which to begin writing the respective data part. The tail further indicates: a part identifier which matches the part identifier indicated in the header; a cyclic redundancy check (CRC) value which indicates a signature for the respective data part encoded with an existing CRC codec; and a part end which indicates an end of the respective data part.

In some embodiments, in response to determining that a current write pointer is at an end of the journal zone, the system sets the current write pointer to a start of the journal zone.

In some embodiments, the system configures a spare sector pool region of the non-volatile memory to be utilized by both a pending sector replacement and data which requires additional storage capacity due to the pre-allocated journal zone.

In some embodiments, the storage drive includes a hard disk drive.

In some embodiments, the system allocates a zone of the non-volatile memory of the storage device as the pre-allocated journal zone.

BRIEF DESCRIPTION OF THE FIGURES

In the figures, like reference numerals refer to the same figure elements.

DETAILED DESCRIPTION

Figure 1:
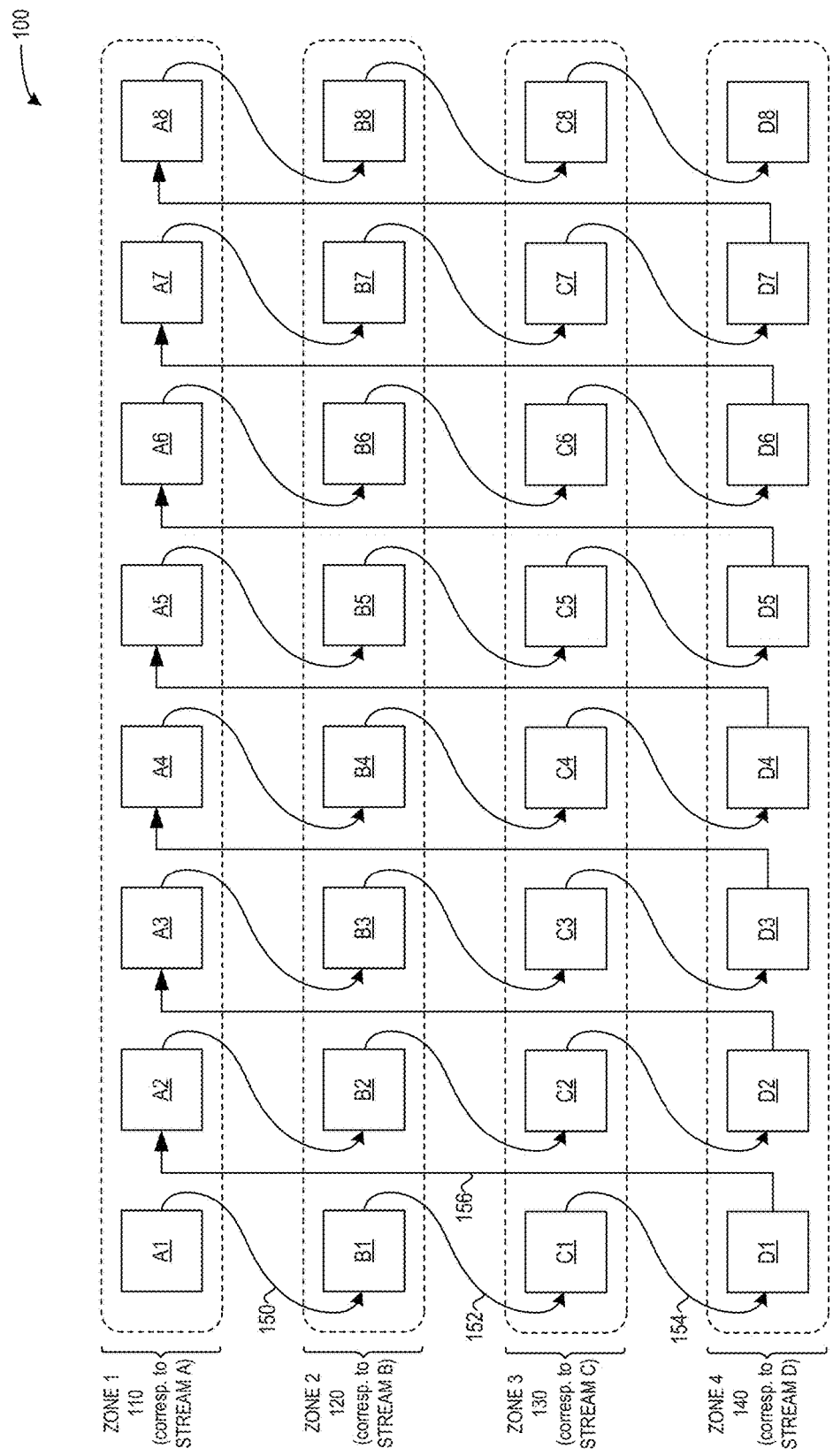
FIG. 1 illustrates an exemplary environment that facilitates data placement in a storage device, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of improving the efficiency of processing multiple incoming data streams in a hard disk drive (HDD) by using a pre-allocated journal zone, formatting the data with metadata, and re-ordering the data parts to be written sequentially to a destination zone, without requiring repeated moves by a write head of the HDD.

As described above, the capacity of HDDs continues to increase. At the same time, virtualization allows an increasing number of clients to share the resources of the same physical devices (such as an HDD). As a result, a single HDD may receive multiple write jobs in parallel. Each write job is part of a separate stream with multiple data parts, and each stream can be written to a different physical zone of the HDD on a platter. However, because an HDD is a spindle storage device with only one physical write head per platter, the write head must switch or move repeatedly between multiple physical zones on the platter, which can increase both the seek time and the rotation time. This can decrease the efficiency of the HDD as well as the overall efficiency and performance of the storage system, as described below in relation to FIG. 1.

The embodiments described herein address these challenges by providing a system which reduces the seek and rotation time of handling multiple streams. The system can allocate a journal zone, format the data with metatadata, and concatenate data parts to write the data to specific destination zones. The system can receive incoming data from multiple streams, where the incoming data includes a plurality of data parts. The system can format the data parts (in a first data buffer) by inserting a header before and a tail after each data part. The header and the tail comprise metadata which indicate, for example, an order and a destination zone for each data part in its respective stream. The system can write the formatted data parts to the pre-allocated journal zone. The system can order the formatted data parts (in a second data buffer) based on the indicated metadata in the header and the tail of each formatted data part, and can concatenate the data parts based on the order. The system can then write the concatenated data parts to a specific destination zone in a sequential manner, which eliminates the need for the system to seek and rotate to a different destination zone for each specific data part (as in the prior art).

By including the metadata (e.g., the header and the tail), the system can ensure data consistency. Furthermore, the system can provide fault tolerance by using the metadata to reconstruct mapping information, as described below in relation to FIG.

Thus, the embodiments described herein provide a system which improves the efficiency of a storage system, where the improvements are fundamentally technological. The improved efficiency can include an improved performance in latency for completion of an I/O operation. The system provides a technological solution (i.e., a HDD with a pre-allocated journal zone for storing data from multiple streams, and formatting and subsequently concatenating data parts for sequential placement in a destination zone) to the technological problem of reducing the seek and rotation time involved in processing data from multiple streams in parallel, which improves both the Quality of Service (QoS) assurance and the overall efficiency of the system.

Exemplary Environment for Facilitating Data Placement in the Prior Art

FIG. 1 illustrates an exemplary environment 100 that facilitates data placement in a storage device, in accordance with the prior art. Environment 100 depicts multiple streams (e.g., streams A, B, C, and D) which are to be written in parallel, to different physical zones on a storage device. Each physical can zone correspond to a stream, and can include a plurality of data parts. For example, a physical zone 1 110 can correspond to a stream A of incoming write data, where data parts A1-A8 are to be written to zone 1110. Similarly, data parts B1-B8 of stream B are to be written to a physical zone 2 120, data parts C1-C8 of stream C are to be written to a physical zone 3 130, and data parts D1-D8 of stream D are to be written to a physical zone 4 140.

The system can write data to specific zones on a platter of a HDD in the order indicated by the arrows. For example, the system can begin by moving a write head and writing data part A1 to zone 1 110, moving the write head to zone 2 to write data part B1 in zone 2 120 (arrow 150), moving the write head to zone 3 to write data part C1 in zone 3 130 (arrow 152), moving the write head to zone 4 to write data part D1 in zone 4 140 (arrow 154), and then moving the write head back to zone 1 to write data part A2 to zone 1 110 (arrow 156), etc. In environment 100, the HDD is constantly "switching" the location of its write head. That is, the HDD must move its write head each time to seek and rotate to a different zone (e.g., as indicated by the arrows 150-156). With each "switch," the HDD moves it write head to the correct track in the specific zone, and waits for the platter to rotate to the correct position in the specific zone at which to write the data part.

As the number of parallel streams increases, so decreases the performance of the HDD. Although each stream corresponds to a sequential write in the physical HDD, the many (e.g., dozens) of writes to different physical locations (e.g., tracks in zones) can result in a decreased efficiency. For example, the consumption of the seek time and the rotate time can result in an increased latency and a decreased QoS (due to repeated physical vibrations). Furthermore, the HDD DRAM write cache may be burdened with the accumulation of an increasing amount of data in order to handle the multiple streams of data. This may result in issues with data consistency. If the system experiences a fault, such as due to a power loss or a crash of the operating system, the system may lose the data which is held in the HDD DRAM cache. These challenges can decrease the efficiency of the overall storage system, and can also result in a decreased level of QoS assurance.

Figure 2:
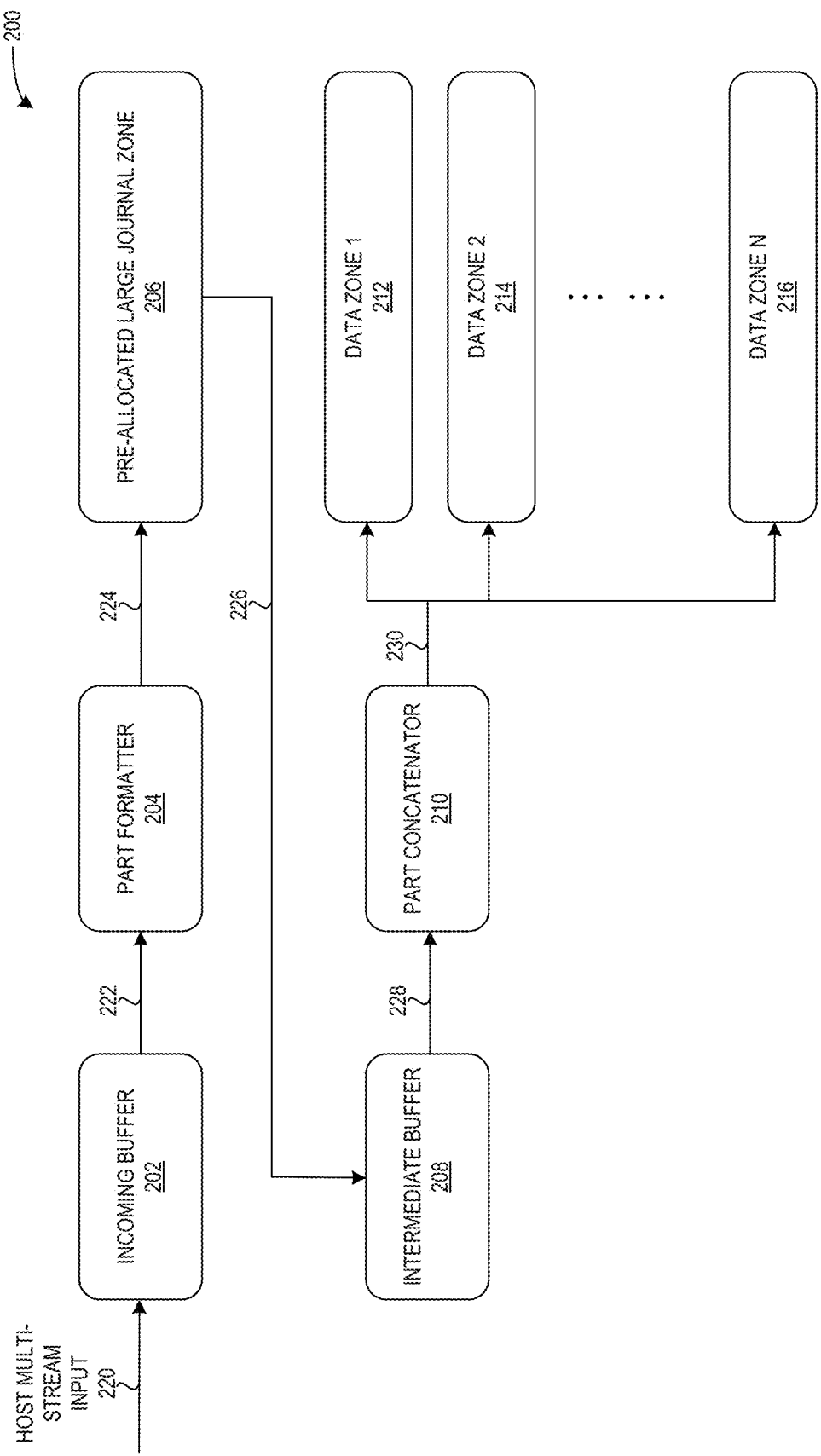
FIG. 2 illustrates an exemplary architecture of a storage system, in accordance with an embodiment of the present application.

Exemplary Architecture of a Storage System Using a Pre-Allocated Journal Zone for Handling Multiple Streams of Write Data The embodiments described herein provide a system which addresses the challenges described above in the conventional systems. FIG. 2 illustrates an exemplary architecture 200 of a storage system, in accordance with an embodiment of the present application. The system can allocate a specific "journal zone" in the non-volatile memory of the HDD (e.g., a large zone on a platter of the HDD, described below as a "pre-allocated journal zone" in relation to FIG. 6). This journal zone is configured to hold the incoming data from multiple streams. During operation, the system can receive incoming data from multiple streams (host multi-stream input 220). The incoming data from the multiple streams can enter an incoming buffer 202 of the HDD controller, and be passed via a communication 222 to a part formatter module 204. Part formatter 204 can format each data part by inserting a header before and a tail after each data part. A formatted data part can thus include a respective data part, the header, and the tail. The header and the tail can indicate metadata for the data part, including an order and a destination zone for the respective data part within a stream. A formatted data part is described below in relation to FIG. 4.

Upon formatting the data parts, the system can write (via a communication 224) the formatted data parts to a pre-allocated large journal zone 206, in a sequential manner without switching zones. That is, the formatted data parts can be sequentially written to the one pre-allocated journal zone 206, as described below in relation to FIG. 3. Once a respective data part has been written to journal zone 206, the system can confirm the data to the host as successfully written (not shown).

The system can perform ongoing background reading to place the data parts (of the formatted data parts) to the correct zone or physical location of the platter. For example, the system can retrieve the formatted data parts (via a communication 226) into an intermediate buffer 208 of the HDD controller, and pass the formatted data parts (via a communication 228) to a part concatenator module 210. Based on the metadata (including the order and the destination zone) indicated in the formatted data parts, part concatenator 210 can identify data parts of the same stream, order the identified data parts within the stream, and write the ordered data parts (without the header and the tail) of the same stream sequentially into the indicated destination zone (e.g., via a communication 230 to one of data zone 1 212, data zone 2 214, and data zone N 216). That is, the system can remove the header and the tail from each formatted data part before writing the data part to the destination zone.

Figure 3:
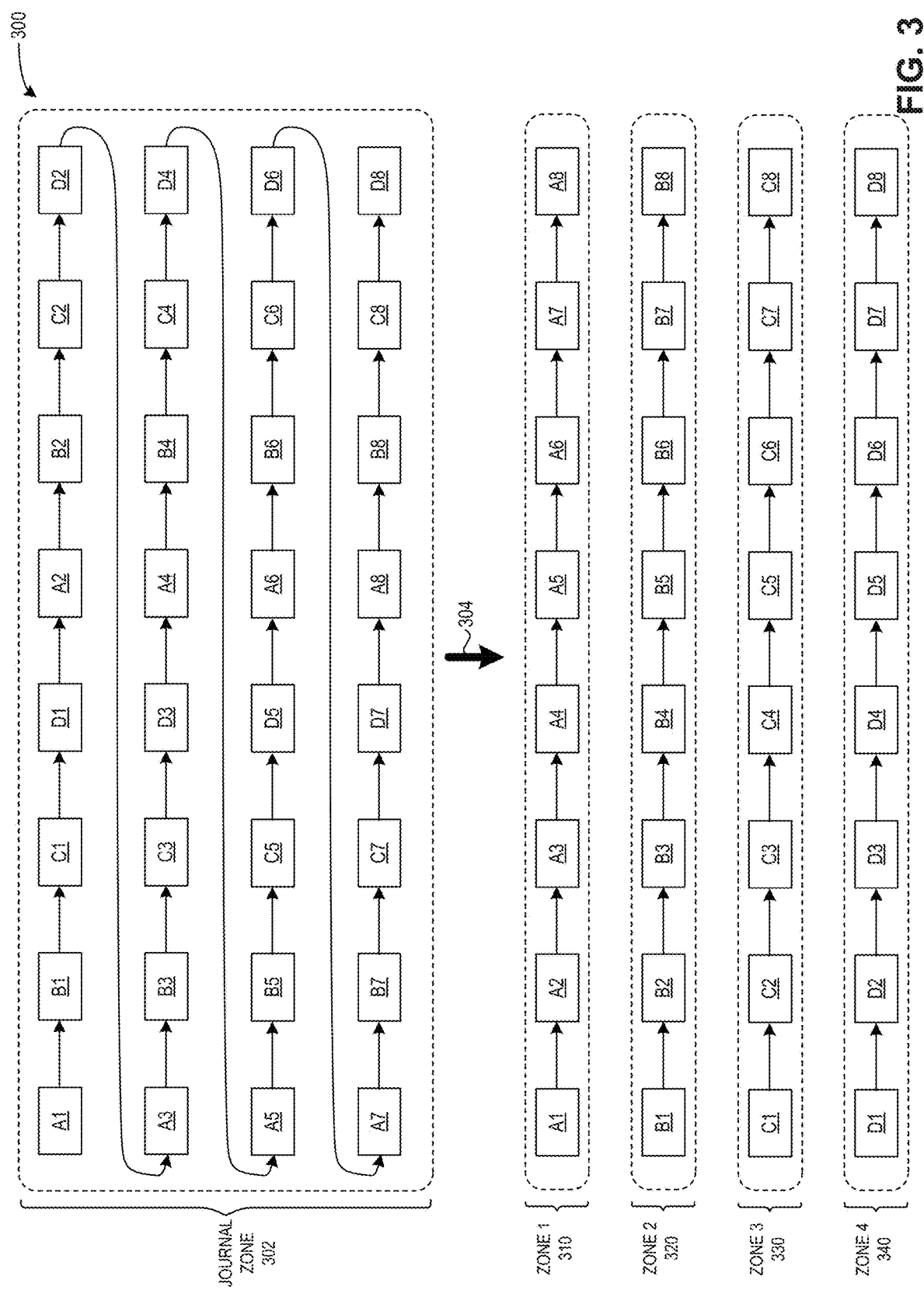
FIG. 3 illustrates an exemplary environment that facilitates data placement in a storage device, in accordance with an embodiment of the present application.

FIG. 3 illustrates an exemplary environment 300 that facilitates data placement in a storage device, in accordance with an embodiment of the present application. Similar to environment 100, environment 300 can include data from four incoming parallel streams A, B, C, and D (where each stream includes, respectively, data parts A1-A8, B1-B8, C1-C8, and D1-D8). The system can receive the plurality of data parts of streams A-D, and can mix the data parts together when writing the data parts to a journal zone 302 (as indicated by the arrows from A1 to B1 to C1 to D1 to A2, etc.). Subsequently, when the system performs the ongoing background reading to place each data part in the correct zone or physical location (via a communication 304), the system can read out from journal zone 302 the data parts belonging to the same stream, order and pack those data parts together (e.g., concatenates them), drop the metadata (i.e., the header and the tail), and write the ordered and concatenated data parts to each specific zone.

For example, using the metadata indicated in the formatted data parts (e.g., the header and the tail), the system (via, e.g., concatenator module 210 of FIG. 2) can identify data parts A1-A8 from journal zone 302 as belonging to a same stream, order data parts A1-A8, concatenate the data from data parts A1-A8 (e.g., by removing the metadata), and write the concatenated data sequentially as a single stream of data to a zone 1 310, without having to move the write head repeatedly to other physical zones during the writing of the data parts A1-A8 of stream A to zone 1 310.

Similarly, the system can identify parts B1-B8 of journal zone 302 as belonging to a same stream, order data parts B1-B8, concatenate the data from data parts B1-B8 (e.g., by removing the metadata), and write the concatenated data sequentially as a single stream of data to a zone 2 320, without having to move the write head repeatedly to other physical zones during the writing of the data parts B1-B8 of stream B to zone 2 320. The system can perform similar actions for data parts C1-C8 of stream C (which are written to a zone 3 330), and for data parts D1-D8 of stream D (which are written to a zone 4 340).

Thus, environment 300 illustrates how the system can process incoming data from multiple streams in parallel, and at the time, avoid repeatedly switching the write head to multiple other physical zones while writing the data parts of a single stream.

Exemplary Formatted Data Part as Stored in the Pre-Allocated Journal Zone; Exemplary Concatenation of Data Environment 300 of FIG. 3 depicts a scenario in which the multiple incoming streams are the same length or of a similar length. The embodiments described herein can also process scenarios with multiple incoming data streams of varied length with parts which are not in order, by formatting the metadata (i.e., the header and the tail), in the following manner.

Figure 4A:
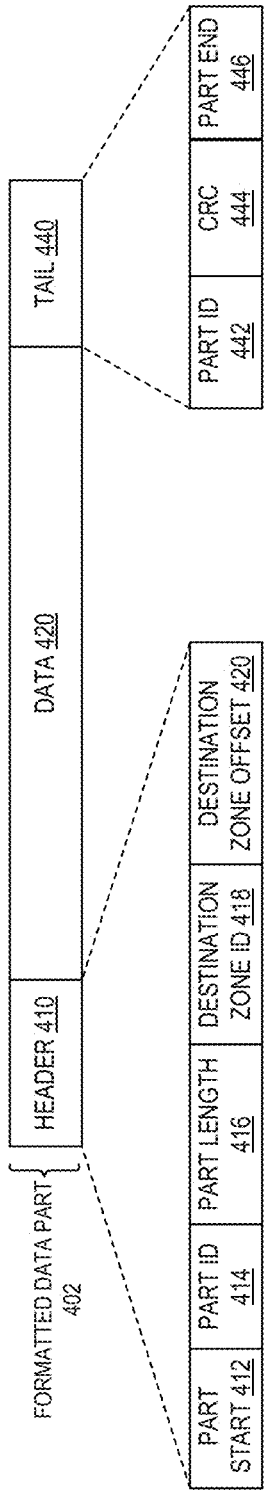
FIG. 4A illustrates an exemplary formatted data part, including a header, data, and a tail (as stored in the pre-allocated journal zone), in accordance with an embodiment of the present application.

FIG. 4A illustrates an exemplary formatted data part 402, including a header 410, data 420, and a tail 440 (as stored in the pre-allocated journal zone), in accordance with an embodiment of the present application. The system can insert header 410 before and tail 440 after each data part of a plurality of data parts of multiple incoming streams of varying length. Header 410 can include: a part start 412 which is a beginning of the respective data part; a part identifier 414 which is a unique identifier of the respective data part; a part length 416 which indicates a number of bits included in the respective data part; a destination zone identifier 418 which is a unique identifier of a zone to which the respective data part is to be written; and a destination zone offset 420 which indicates a position from the part start at which to begin writing the respective data part. Tail 440 can include: a part identifier 442 which matches part identifier 412 indicated in header 410; a cyclic redundancy check (CRC) value 444 which indicates a signature for the respective data part encoded with an existing CRC codec; and a part end 446 which indicates an end of the respective data part. As described above, formatted data part 402 can be stored in a pre-allocated journal zone of the HDD.

Figure 4B:
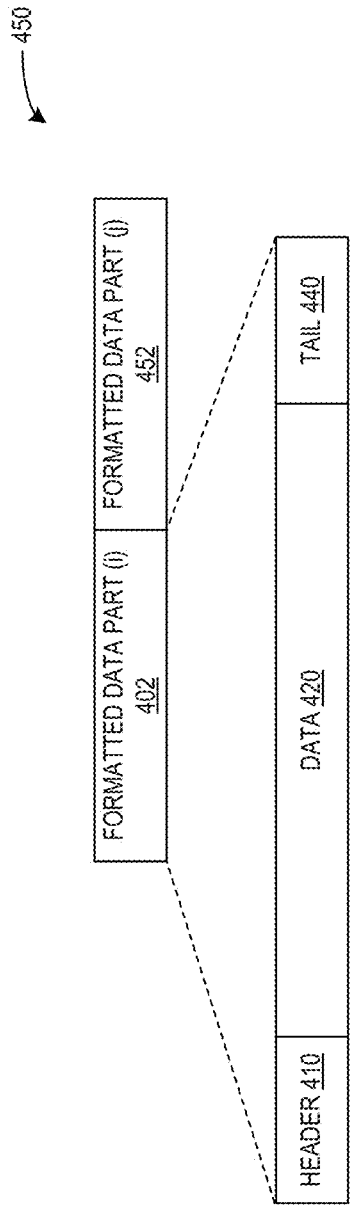
FIG. 4B illustrates an exemplary concatenation of data (in the intermediate buffer) from the exemplary formatted data part of FIG. 4A, in accordance with an embodiment of the present application.

FIG. 4B illustrates an exemplary concatenation of data (in the intermediate buffer) from the exemplary formatted data part 402 of FIG. 4A, in accordance with an embodiment of the present application. During operation in environment 450 of FIG. 4B, the system can read formatted data parts from the pre-allocated journal zone to an intermediate buffer (e.g., from journal zone 206 to intermediate buffer 208 of FIG. 2). The system can validate the formatted data parts by confirming that the part identifier of the header matches the part identifier of the tail, and also by performing a CRC on the data based on the CRC value indicated in the tail. The system can identify which data parts belong to the same stream, order the data parts, and concatenate the ordered data parts to be written sequentially to the given destination zone.

For example, given a formatted data part i 402 and a formatted data part j 452 of a same stream, the system can check that part identifier 414 (of header 410) matches part identifier 442 (of tail 440). The system can also check the validity of data 420 of formatted data part 402 based on CRC value 444 (of tail 440). The system can order the validated (formatted) data parts which are identified as belonging to the same stream, e.g., by checking that the destination zone offset (not shown) of a formatted data part j 452 is equal to the destination zone offset 420 (of header 410) of the previously ordered formatted data part i 402 plus part length 416 (of header 410) of formatted data part i.

Moreover, although the physical address of the data part is maintained by the metadata of the file system, the system can provide an additional fold of data protection in the event of a fault. If the system detects a fault, the system can reconstruct the mapping between a logical address of a data part and a physical address of the data part based on the destination zone identifier and the part length indicated in the respective header of the data part.

Figure 5A:
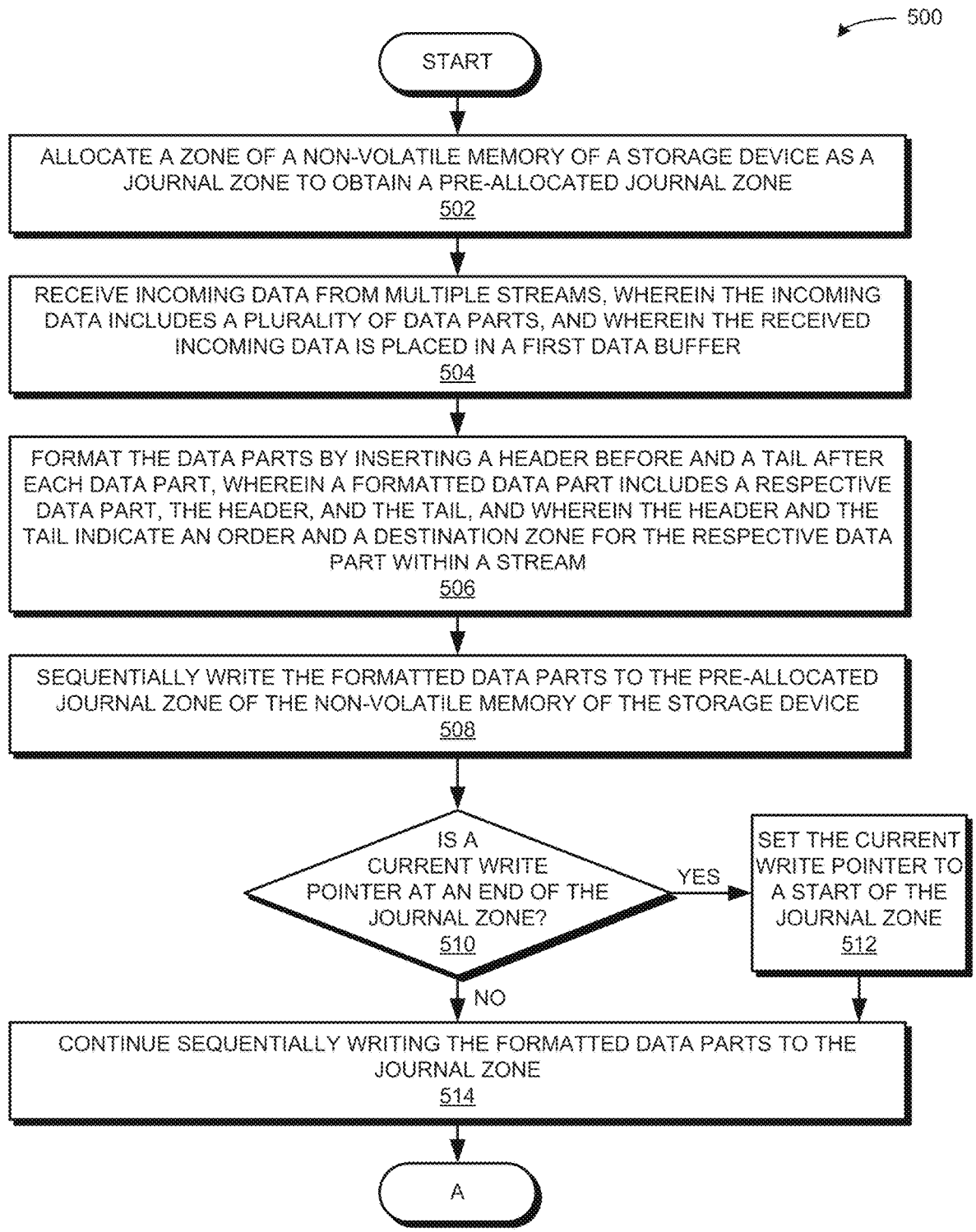
FIG. 5A presents a flowchart illustrating a method for facilitating placement of data from multiple streams in a storage device, in accordance with an embodiment of the present application.

Exemplary Method for Facilitating Placement of Data from Multiple Streams in a Storage Device FIG. 5A presents a flowchart illustrating a method for facilitating placement of data from multiple streams in a storage device, in accordance with an embodiment of the present application. During operation, the system allocates a zone of a non-volatile memory of a storage device as a journal zone to obtain a pre-allocated journal zone (operation 502). The system receives incoming data from multiple streams, wherein the incoming data includes a plurality of data parts, and wherein the received incoming data is placed in a first data buffer (operation 504). The system formats the data parts by inserting a header before and a tail after each data part, wherein a formatted data part includes a respective data part, the header, and the tail, and wherein the header and the tail indicate an order and a destination zone for the respective data part within a stream (operation 506). The system sequentially writes the formatted data parts to the pre-allocated journal zone of a non-volatile memory of the storage device (operation 508).

If the current write pointer is not at an end of the journal zone (decision 510), the operation continues at operation 514. If the current write pointer is at an end of the journal zone (decision 510), the system sets the current write pointer to a start of the journal zone (operation 512). The system continues sequentially writing the formatted data parts to the journal zone (operation 514), and the operation continues at Label A of FIG. 5B. Because the data is written sequentially to the journal zone, after one data part is copied out of the journal zone and written to its corresponding destination zone (as described herein and below in relation to FIG. 5B), the physical space in the journal zone previously occupied by the copied out data may be marked or indicated as ready to be overwritten. Thus, when the write pointer reaches the end of the pre-allocated journal zone, the write pointer can loop back to the start of the journal zone (e.g., in a barrel shifter manner), and begin writing over the physical space which has been previously marked or indicated as ready to be overwritten.

Figure 5B:
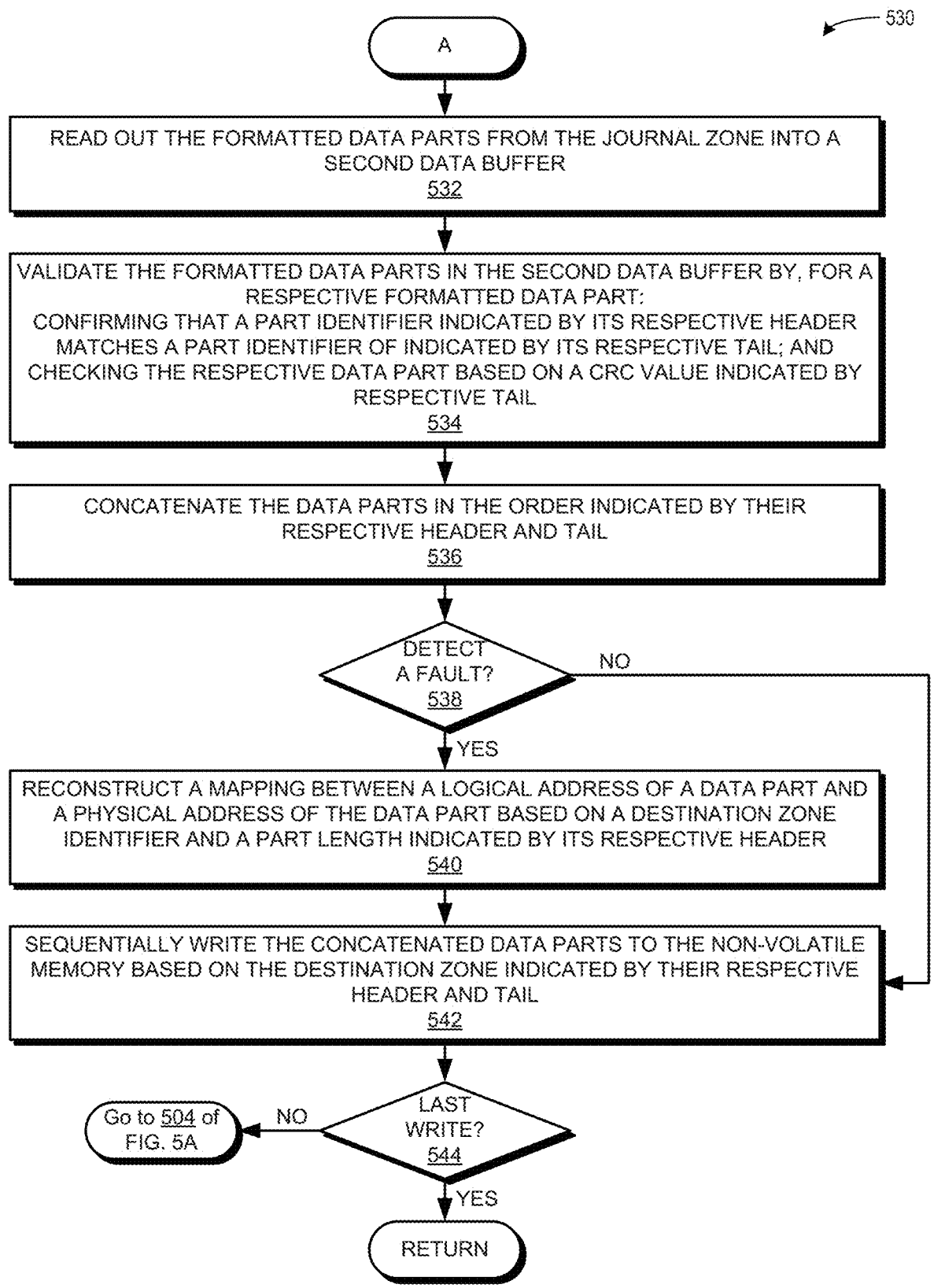
FIG. 5B presents a flowchart illustrating a method for facilitating placement of data from multiple streams in a storage device, in accordance with an embodiment of the present application.

FIG. 5B presents a flowchart 530 illustrating a method for facilitating placement of data from multiple streams in a storage device, in accordance with an embodiment of the present application. During operation, the system reads out the formatted data parts from the journal zone into a second data buffer (operation 532). The system validates the formatted data parts in the second data buffer by, for a respective formatted data part: confirming that a part identifier indicated by its respective header matches a part identifier indicated by of its respective tail; and checking the respective data part based on a CRC value indicated by its respective tail (operation 534). The system concatenates the data parts in the order indicated by their respective header and tail (operation 536).

If the system does not detect a fault (decision 538), the operation continues at operation 542. If the system detects a fault (decision 538), the system reconstructs a mapping between a logical address of a data part and a physical address of the data part based on a destination zone identifier and a part length indicated by its respective header (operation 540). The system sequentially writes the concatenated data parts to the non-volatile memory based on the destination zone indicated by their respective header and tail (operation 542). If the system reaches or determines that the most recent write is not a last write associated with the multiple streams (decision 544), the operation continues at operation 504 of FIG. 5A. If the system reaches or determines that the most recent write is the last write associated with the multiple streams (decision 544), the operation returns.

Shared Spare Sector Pool (with Inter-Configurable Capacity)

Figure 6:
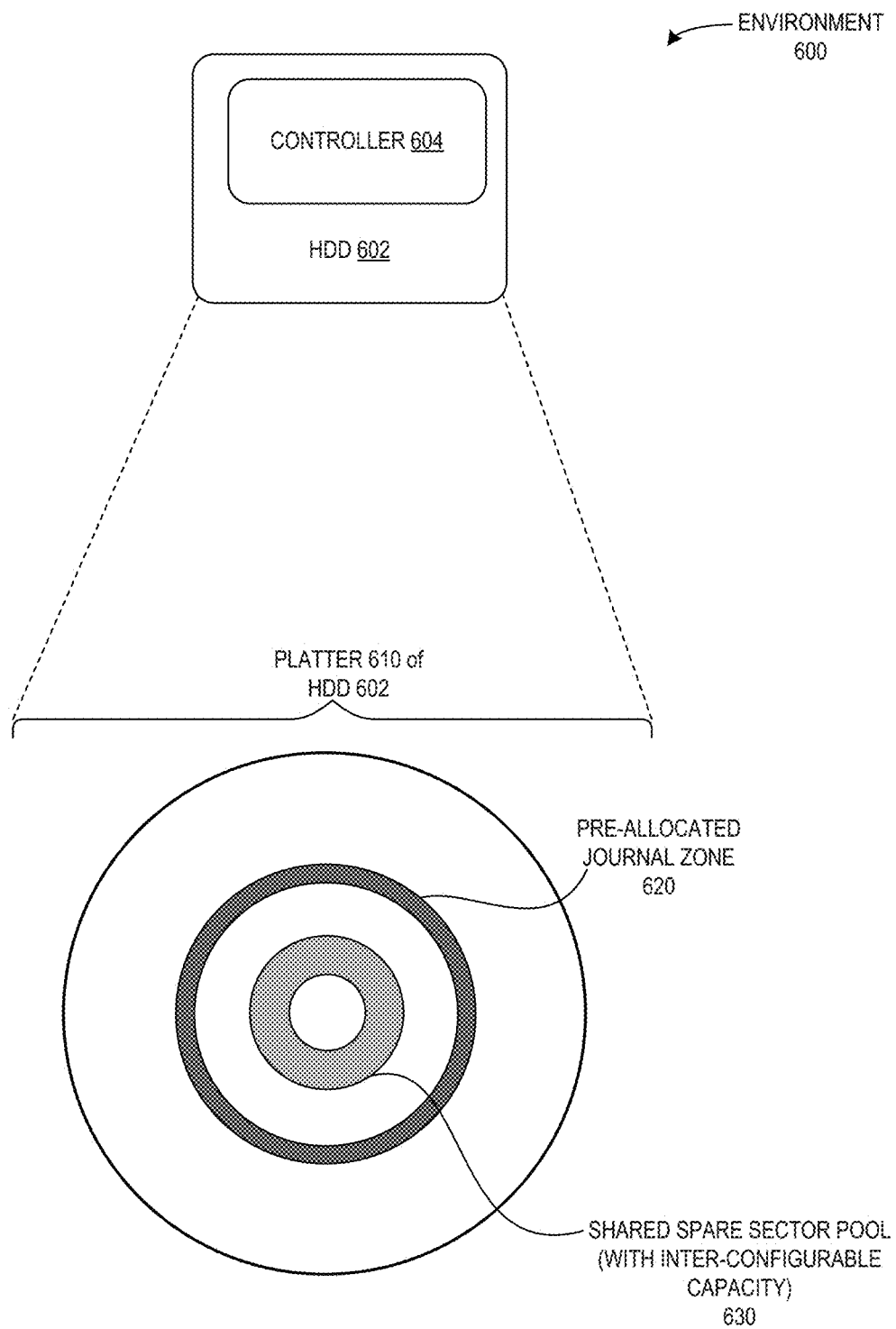
FIG. 6 illustrates an exemplary environment, including a hard disk drive with a pre-allocated journal zone and a shared spare sector pool (with inter-configurable capacity), in accordance with an embodiment of the present application.

FIG. 6 illustrates an exemplary environment 600, including a hard disk drive 602 with a pre-allocated journal zone 620 and a shared spare sector pool (with inter-configurable capacity) 630, in accordance with an embodiment of the present application. HDD 602 can include a controller 604. HDD 602 can also include multiple platters, such as a platter 610.

In HDD 602, the system can configure certain tracks of platter 610 to be allocated as the journal zone, i.e., a pre-allocated journal zone 620. However, allocating this journal zone can result in a decrease in the overall capacity available for storage in the HDD. To solve this issue, the system can use the hidden capacity of the HDD. An HDD is typically designed and manufactured with a larger capacity than its given stated or nominal capacity. Prior to being shipped, a manufacturer may mask out the bad tracks/sectors (referred to as "media defect masking.") After the media defect masking, any additional remaining capacity which is greater than the nominal capacity may be used as the spare sector pool, e.g., for pending sector remapping. In general, the spare sector pool includes many more sectors than the number of pending sectors generated on the fly during the operation of an HDD.

In the embodiments described herein, the system can configure the spare sector pool to be a shared and inter-configurable area, which can be utilized by both a pending sector replacement and data which requires additional storage capacity due to the pre-allocated journal zone, i.e., a shared spare sector pool (with inter-configurable capacity) 630.

Exemplary Computer System and Apparatus

Figure 7:
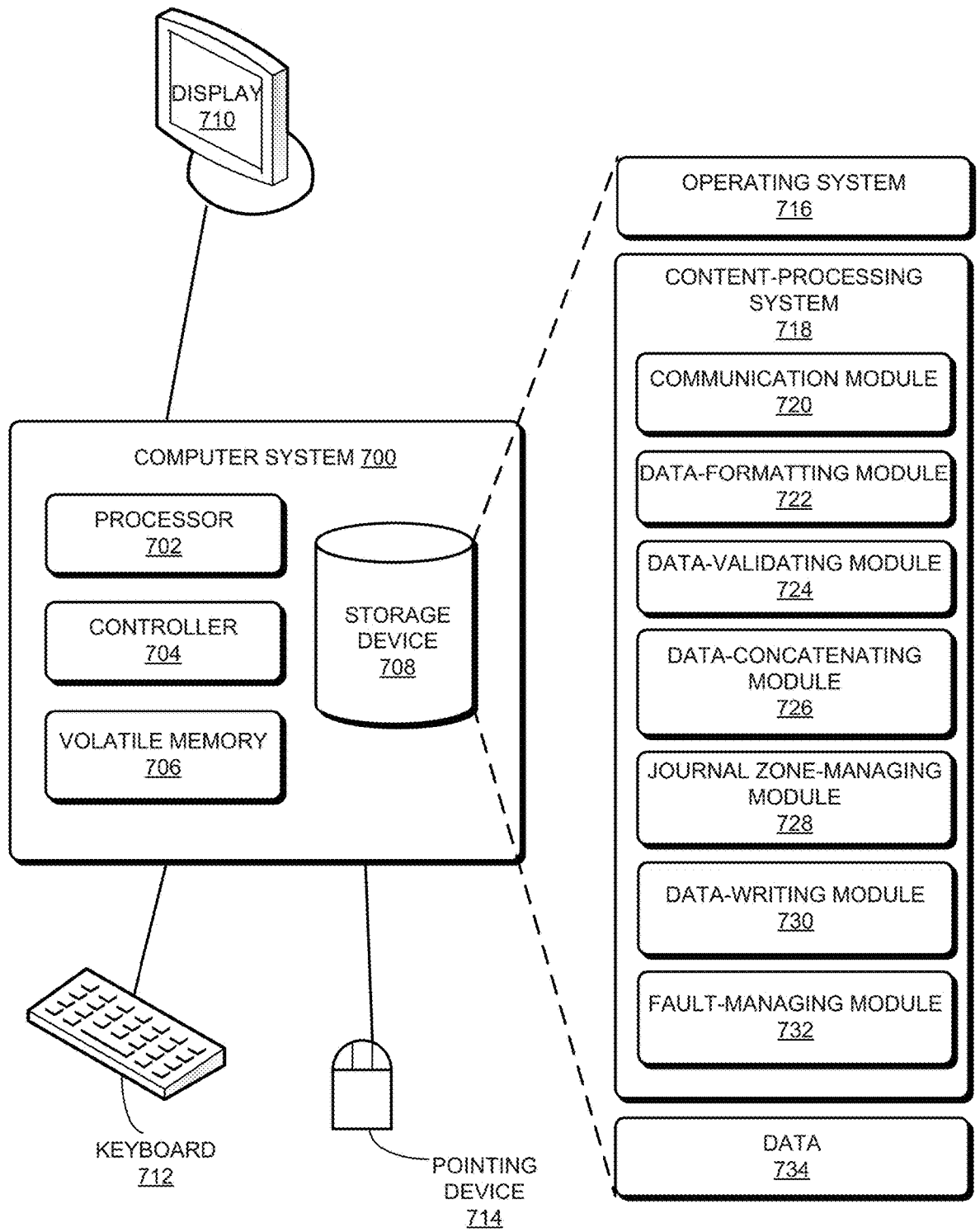
FIG. 7 illustrates an exemplary computer system that facilitates data placement in a storage device, in accordance with an embodiment of the present application.

FIG. 7 illustrates an exemplary computer system 700 that facilitates data placement in a storage device, in accordance with an embodiment of the present application. Computer system 700 includes a processor 702, a controller 704, a volatile memory 706, and a storage device 708. Computer system 700 may also include volatile memory (not shown) which can include, e.g., RAM, that serves as a managed memory, and can be used to store one or more memory pools. Non-volatile memory 706 can include persistent storage, e.g., shingled magnetic recording with a plurality of bands with overlapping tracks, accessed via controller 704. Furthermore, computer system 700 can be coupled to a display device 710, a keyboard 712, and a pointing device 714. Storage device 708 can store an operating system 716, a content-processing system 718, and data 734.

Content-processing system 718 can include instructions, which when executed by computer system 700, can cause computer system 700 to perform methods and/or processes described in this disclosure. Specifically, content-processing system 718 can include instructions for receiving and transmitting data packets, including incoming data from multiple streams, a data part, a formatted data part, a header, and a tail (communication module 720).

Content-processing system 718 can also include instructions for receiving incoming data from multiple streams, wherein the incoming data includes a plurality of data parts (communication module 720). Content-processing system 718 can include instructions for formatting the data parts by inserting a header before and a tail after each data part, wherein a formatted data part includes a respective data part, the header, and the tail, and wherein the header and the tail indicate an order and a destination zone for the respective data part within a stream (data-formatting module 722). Content-processing system 718 can include instructions for sequentially writing the formatted data parts to a pre-allocated journal zone of a non-volatile memory of the storage device (journal zone-managing module 728). Content-processing system 718 can include instructions for concatenating the data parts in the order indicated by their respective header and tail (data-concatenating module 726). Content-processing system 718 can include instructions for sequentially writing the concatenated data parts to the non-volatile memory based on the destination zone indicated by their respective header and tail (data-writing module 730).

Content-processing system 718 can include instructions for detecting a fault, and for reconstructing a mapping between a logical address of a data part and a physical address of the data part based on a destination zone identifier and a part length indicated by its respective header (fault-managing module 732). Content-processing system 718 can include instructions for validating the formatted data parts in the second data buffer (data-validating module 724). Content-processing system 718 can include instructions for allocating a zone of the non-volatile memory of the storage device as the pre-allocated journal zone (journal zone-managing module 728).

Data 734 can include any data that is required as input or that is generated as output by the methods and/or processes described in this disclosure. Specifically, data 734 can store at least: data; a stream of data; a data part; a formatted data part; a header; a tail; an indicator of a fault; a logical address; a physical address; a mapping between a logical address and a physical address; a data buffer; a part start; a part identifier; a part length; a destination zone identifier; a destination zone offset; a part identifier indicated in a tail; a CRC value; encoded data; an indicator of a location of a write pointer; an indicator of a start or an end in a zone; a spare sector pool or region; a zone; a journal zone; a pre-allocated journal zone; a destination zone; data parts; formatted data parts; validated data parts; ordered data parts; concatenated data; and an indicator of a validation or check of a data part.

Figure 8:
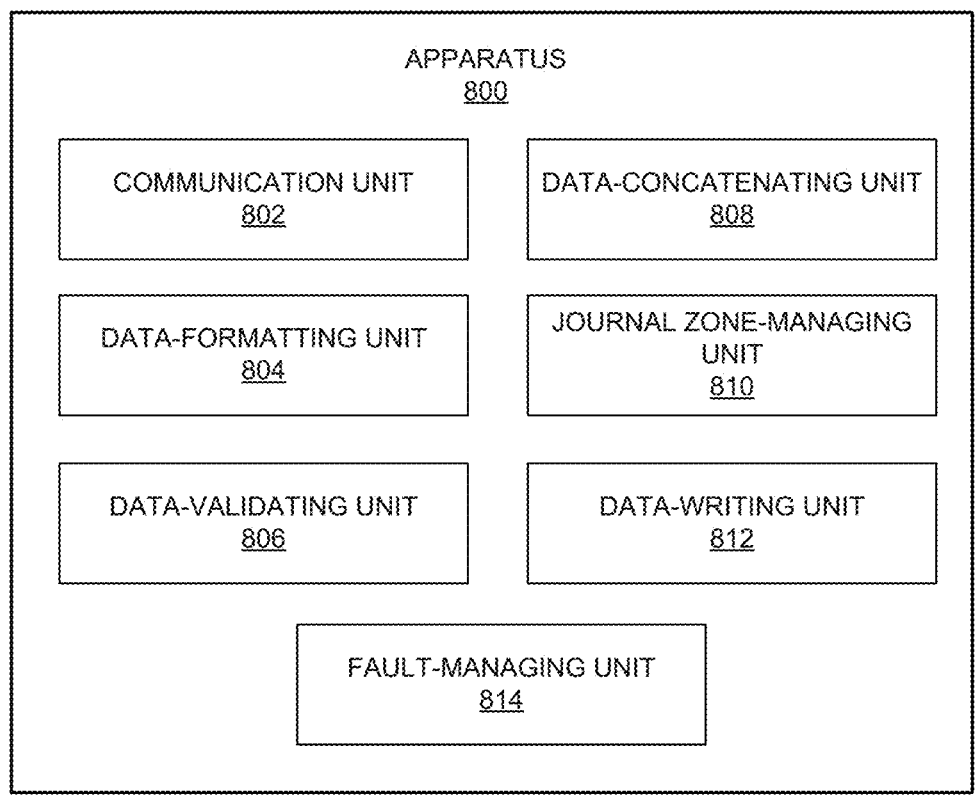
FIG. 8 illustrates an exemplary apparatus that facilitates data placement in a storage device, in accordance with an embodiment of the present application.

FIG. 8 illustrates an exemplary apparatus 800 that facilitates data placement in a storage device, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-814 which perform functions or operations similar to modules 720-732 of computer system 700 of FIG. 7, including: a communication unit 802; a data-formatting unit 804; a data-validating unit 806; a data-concatenating unit 808; a journal zone-managing unit 810; a data-writing unit 812; and a fault-managing unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data placement in a storage device, the method comprising:
receiving incoming data from multiple streams, wherein the incoming data includes a plurality of data parts;
formatting the data parts by inserting a header before and a tail after each data part, wherein a formatted data part includes a respective data part, the header, and the tail, and wherein the header and the tail indicate an order and a destination zone for the respective data part within a stream;

sequentially writing the formatted data parts to a pre-allocated journal zone of a non-volatile memory of the storage device;

concatenating the data parts in the order indicated by their respective header and tail; and sequentially writing the concatenated data parts to the non-volatile memory based on the destination zone indicated by their respective header and tail.

2. The method of claim 1, wherein prior to sequentially writing the concatenated data parts to the non-volatile memory, the method further comprises:

detecting a fault; and reconstructing a mapping between a logical address of a data part and a physical address of the data part based on a destination zone identifier and a part length indicated by its respective header.

3. The method of claim 1, wherein the received incoming data is placed in a first data buffer, and wherein subsequent to sequentially writing the formatted data parts to the pre-allocated journal zone, the method further comprises:

reading out the formatted data parts from the pre-allocated journal zone into a second data buffer; and validating the formatted data parts in the second data buffer.

4. The method of claim 3, wherein validating the formatted data parts in the second data buffer involves, for a respective formatted data part:

confirming that a part identifier indicated by its respective header matches a part identifier indicated by its respective tail; and checking the respective data part based on a cyclic redundancy check value indicated by its respective tail.

5. The method of claim 1, wherein the header further indicates:

a part start which is a beginning of the respective data part;

a part identifier which is a unique identifier of the respective data part;

a part length which indicates a number of bits included in the respective data part;

a destination zone identifier which is a unique identifier of a zone to which the respective data part is to be written; and a destination zone offset which indicates a position from the part start at which to begin writing the respective data part, and wherein the tail further indicates:

a part identifier which matches the part identifier indicated in the header;

a cyclic redundancy check (CRC) value which indicates a signature for the respective data part encoded with an existing CRC codec; and a part end which indicates an end of the respective data part.

6. The method of claim 1, wherein in response to determining that a current write pointer is at an end of the pre-allocated journal zone, the method further comprises setting the current write pointer to a start of the pre-allocated journal zone.

7. The method of claim 1, further comprising:

configuring a spare sector pool region of the non-volatile memory to be utilized by both a pending sector replacement and data which requires additional storage capacity due to the pre-allocated journal zone.

8. The method of claim 1, wherein the storage drive includes a hard disk drive.

9. The method of claim 1, further comprising:

allocating a zone of the non-volatile memory of the storage device as the pre-allocated journal zone.

10. A computer system for facilitating data placement, the system comprising:

a processor; and a memory coupled to the processor and storing instructions, which when executed by the processor cause the processor to perform a method, wherein the computer system is a storage device, the method comprising:

receiving incoming data from multiple streams, wherein the incoming data includes a plurality of data parts;

formatting the data parts by inserting a header before and a tail after each data part, wherein a formatted data part includes a respective data part, the header, and the tail, and wherein the header and the tail indicate an order and a destination zone for the respective data part within a stream;

sequentially writing the formatted data parts to a pre-allocated journal zone of a non-volatile memory of the storage device;

concatenating the data parts in the order indicated by their respective header and tail; and sequentially writing the concatenated data parts to the non-volatile memory based on the destination zone indicated by their respective header and tail.

11. The computer system of claim 10, wherein prior to sequentially writing the concatenated data parts to the non-volatile memory, the method further comprises:

detecting a fault; and reconstructing a mapping between a logical address of a data part and a physical address of the data part based on a destination zone identifier and a part length indicated by its respective header.

12. The computer system of claim 10, wherein the received incoming data is placed in a first data buffer, and wherein subsequent to sequentially writing the formatted data parts to the pre-allocated journal zone, the method further comprises:

reading out the formatted data parts from the pre-allocated journal zone into a second data buffer; and validating the formatted data parts in the second data buffer.

13. The computer system of claim 12, wherein validating the formatted data parts in the second data buffer involves, for a respective formatted data part:

confirming that a part identifier indicated by its respective header matches a part identifier indicated by its respective tail; and checking the respective data part based on a cyclic redundancy check value indicated by its respective tail.

14. The computer system of claim 10, wherein the header further indicates:

a part start which is a beginning of the respective data part;

a part identifier which is a unique identifier of the respective data part;

a part length which indicates a number of bits included in the respective data part;

a destination zone identifier which is a unique identifier of a zone to which the respective data part is to be written; and a destination zone offset which indicates a position from the part start at which to begin writing the respective data part, and wherein the tail further indicates:
  a part identifier which matches the part identifier indicated in the header;
  a cyclic redundancy check (CRC) value which indicates a signature for the respective data part encoded with an existing CRC codec; and
  a part end which indicates an end of the respective data part.

15. The computer system of claim 10, wherein in response to determining that a current write pointer is at an end of the pre-allocated journal zone, the method further comprises setting the current write pointer to a start of the pre-allocated journal zone.

16. The computer system of claim 10, wherein the method further comprises:
  configuring a spare sector pool region of the non-volatile memory to be utilized by both a pending sector replacement and data which requires additional storage capacity due to the pre-allocated journal zone.

17. The computer system of claim 10, wherein the storage drive includes a hard disk drive.

18. The computer system of claim 10, wherein the method further comprises:
  allocating a zone of the non-volatile memory of the storage device as the pre-allocated journal zone.

19. An apparatus for facilitating data placement, the apparatus comprising:
  a communication unit configured to receive incoming data from multiple streams, wherein the incoming data includes a plurality of data parts;
  a data-formatting unit configured to format the data parts by inserting a header before and a tail after each data part, wherein a formatted data part includes a respective data part, the header, and the tail, and wherein the header and the tail indicate an order and a destination zone for the respective data part within a stream;
  a journal zone-managing unit configured to sequentially write the formatted data parts to a pre-allocated journal zone of a non-volatile memory of the storage device;
  a data-concatenating unit configured to concatenate the data parts in the order indicated by their respective header and tail; and
  a data-writing unit configured to sequentially write the concatenated data parts to the non-volatile memory based on the destination zone indicated by their respective header and tail.

20. The apparatus of claim 19, wherein the journal zone-managing unit is further configured to allocate a zone of the non-volatile memory of the storage device as the pre-allocated journal zone, and wherein the apparatus further comprises:
  a fault-managing unit configured to:
    detect a fault; and
    reconstruct a mapping between a logical address of a data part and a physical address of the data part based on a destination zone identifier and a part length indicated by its respective header; and
  a data-validating unit configured to:
    read out the formatted data parts from the pre-allocated journal zone into a second data buffer; and
    validate the formatted data parts in the second data buffer.

* * * * *